March 13, 1951     J. CLAYTON     2,545,193
TENSIONING DRIVE DEVICE
Filed May 4, 1946
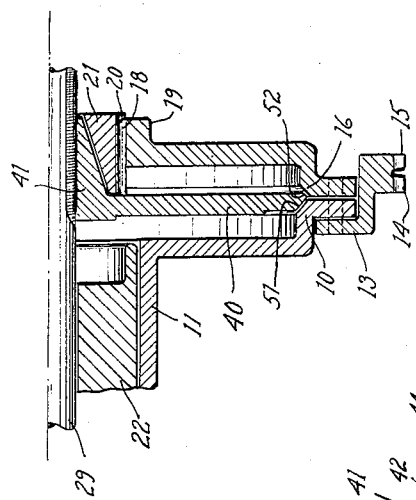
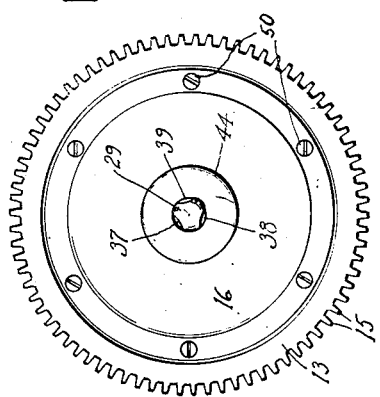
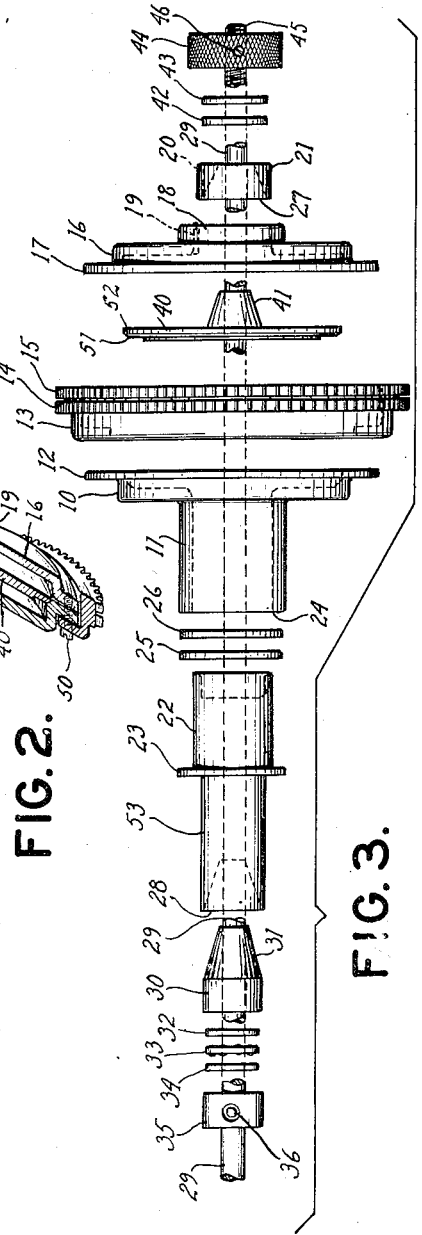
INVENTOR.
JOSEPH CLAYTON.
BY
Van Deventer & Grier
ATTORNEYS Patented Mar. 13, 1951

2,545,193

UNITED STATES PATENT OFFICE 2,545,193

TENSIONING DRIVE DEVICE

Joseph Clayton, New York, N. Y.

Application May 4, 1946, Serial No. 667,363

11 Claims. (Cl. 242—55)

This invention relates to tensioning devices, and more particularly to the type of take-up or tensioning device disclosed in United States Patent Number 1,705,899, granted March 19, 1929. In the aforesaid patent is shown and described a take-up or tensioning device for use in conjunction with winding devices for various purposes, which functions to maintain the material being wound under constant tension during the winding operation.

Such devices have been commonly employed with film winding mechanism, such as is used in motion picture projectors and the like, and such devices are commonly termed even-tension take-up devices.

Accordingly, the present invention will be described more particularly in connection with a device for winding film, but it will be understood that the device is applicable to many other uses where it is desired to maintain an even tension on the material being wound irrespective of the diameter of the roll of material, as the winding torque is automatically proportioned to the load.

The following specification and the accompanying drawings disclose a preferred embodiment of the device; the construction and arrangement of the parts may be varied without, however, departing from the scope of the appended claims.

In the accompanying drawings:

Figure 1 is a front elevational view of the clutch end of a device embodying the invention;

Figure 2 is a view in perspective of the co-operating elements of the invention with some of the parts partly in section;

Figure 3 is an exploded plan view of the operating elements shown in Figure 2; and Figure 4 is an enlarged view of the perimeter of the friction disc shown in Figures 2 and 3.

Referring now to the drawings in detail, the numeral 10 denotes the back plate of a clutch which plate has preferably formed integral therewith a hub 11. The plate has an annular outwardly extending flange 12 to which may be secured a ring driving member generally indicated by the numeral 13, which may be adapted to receive a belt or any other driving means to rotate the device. One preferred form of driving member has two rows of teeth 14, 15, to receive a driving chain such as commonly used in motion picture projectors.

The numeral 16 generally denotes the front plate of the clutch which has a flange 17 which extends into the ring driving member 13 so that it lies against the flange 12 and is secured thereto by screws as hereinafter referred to. Plates 10 and 16 form a removable casing surrounding a friction disc to be presently described.

The plate 16 has a central aperture 18 therein which has a key or projection 19 fitting into a groove 20 in the internally tapered bushing 21, which is therefore slidable in and out of said aperture.

The hub 11 is bored out to accommodate a support 22 which extends into the hub. The bearing support has a shoulder 23 which, when the support is in place in the hub, is spaced from the end 24 of the hub by means of suitable adjusting washers 25, 26. The portion 53 of support 22 is received in a fixed sleeve on the machine and is fixed thereto by a set screw or in any other suitable manner, so that the support 22 is fixed. The sleeve or arm on which the sleeve-like support is fixed may be part of the projector or magazine and is usual and therefore not shown in this drawing.

The bushing 21 has an inner cone bearing surface 27 and the bearing support 22 has an inner cone bearing surface 28.

A shaft 29 has a tapered bushing 30 which is free to revolve on the shaft and which is therefore movable therealong. This bushing is tapered as shown at 31 said taper corresponding to the taper of the cone bearing surface 28.

A thrust washer 32 is placed on the shaft 29 and is movable therealong.

A thrust ball-bearing 33, is placed on the shaft and is freely movable therealong, and a second thrust washer 34 is placed on the shaft.

A stop member 35 is then placed on the shaft and may be secured therealong by any suitable means, such as the set screw 36.

The outer end of the shaft 29, where it extends to the right in the figures beyond the back plate 10 of the clutch, is threaded and flattened in one or more places, as shown at 37, 38, 39, in Figure 1, and a friction disc generally indicated by the numeral 40 has a central aperture which clears the threaded part of the shaft, but engages the flats thereon so that the disc may be rotated by the shaft, but is free to slide therealong. The friction disc 40 has its outer periphery beveled off at angles which, for the sake of illustration, may be 34 degrees. Said angular surfaces are opposed to and may engage similar angular surfaces on the inside faces of the back plate 10 and the front plate 16 of the clutch.

The friction disc has an outwardly extending hub portion 41 which is tapered to fit the cone bearing surface 27 of the bushing 21.

A pair of washers 42, 43, are placed over the outer end of the shaft and an interiorly-threaded adjusting nut 44 fits the outer threaded end 45 of the shaft and may be locked thereto by means of the set screw 46.

The left hand end of shaft 29 is adapted to support the usual film reel (not shown) containing the film to be wound and it may therefore be provided with a portion 47 which may have a key or other member 48 fitting into the usual slotted head of the film reel and the usual snap finger 49 is then moved to position at right angles to the axis of the shaft 29 to hold the reel thereon in the well-known manner. Obviously any reel mounting arrangement can be used, provided the reel is rotatably secured to the shaft 29.

It will be observed from the foregoing that the shaft 29 when assembled in the device as shown in Figure 2 is supported by the cone shaped surfaces 27, 41, and 28, 31 and the other parts such as hub 11 and the support 22 are bored out sufficiently to provide clearance for the shaft. It will also be observed that the friction disc 40 is supported on and revolves with the shaft without wobble, although it is longitudinally movable therealong.

The device is assembled by placing the friction disc 40 on shaft 29 between the back plate 10 and the front plate 16 and securing the front and back plate together and to the driving member 13 by means of screws 50 as shown in Figure 2 or in any other suitable manner. When so assembled, with the other parts in place as previously described, the stop member 35 and the nut 44 may be adjusted longitudinally on shaft 29 holding all of the parts together in assembled relation, with the friction disc 40 floating between the tapered surfaces on the interior faces of the clutch members 10 and 16 so that the tapered surface 51 of the friction disc 40 is in contact with the plate 10 of the clutch.

Adverting now to the aforesaid Patent 1,705,899 it will be seen that the device therein has a shaft carrying a reel and similar to the shaft 29 of the instant application, and that the shaft of the device in the patent is supported at two points; namely, at one end similar to the bearing 28, 31 in the instant application and also by the engagement of a tapered surface on the perimeter of the disc like the surface 51 of disc 40 in the instant application. The result is that in the patented device when the assembly is adjusted in order to vary the frictional engagement of the friction disc with its back plate or cooperating clutch member (and the patented device discloses only one such member), the entire shaft assembly may run out of line, the shaft being no longer concentric with the bearing 28, 31, and the friction disc only contacting over a part of its tapered surface 51 with the cooperating member of the clutch. The result is in some instances that uneven wear of the perimeter of the clutch member occurs and it is necessary to obtain a very precise adjustment of the working parts in order to insure a smooth uniform operation and freedom from wobble.

In operation an increased load is applied to shaft 29, as the diameter of the roll of film increases, thereby increasing the weight of the roll, bushing 21 forces the disc 40 to the left and brings the tapered surface 51 thereof more closely in engagement with the corresponding tapered face on the back plate 10. The result is an increase in friction between the friction disc 40 forming one clutch member and the back plate 10 forming a second clutch member.

However, as the shaft 29 is supported at both ends by the tapered bearings 28, 31, and 27, 41, the shaft 29 remains substantially parallel, and the friction surface 51 of the friction disc remains substantially parallel to the cooperating surfaces on the clutch members 10. The result is that these friction surfaces—when engaged—are engaged substantially all the way around their perimeters and a smooth uniform tension results. This condition is obtained by the fact that there is very little longitudinal movement of the friction disc 40 relative to the plates 10 of the clutch as previously explained.

The device can therefore be set so that at the beginning of the winding operation with a small amount of film on the spool, where but little torque is necessary to wind same, the slippage between the frictionally engaged clutch members may be such that the pull upon the film will be just sufficient to maintain the same under the proper tension and prevent loose wrapping, or winding. As the convolutions of film build up with a resulting increase in the weight of the material and consequent need for more torque, the clutch surfaces will be gradually urged into closer contact as the tapered portion 31 of member 30 moves outwardly upon the bearing surface 28 in response to the increasing load caused by the film at that end of the shaft. This occurs because the bearing surface 27 moves inwardly contacting the taper 41 and pushing the disc 40 to the left. The two surfaces 27 and 41 form a support the while for the outer end of the shaft 29, and maintain the plane of the disc 40 perpendicular to the shaft and parallel to the cooperating member of the clutch.

It will be apparent from the foregoing that throughout the winding operation the film being wound will be automatically maintained under a constant and uniform tension irrespective of the number of turns upon the spool or other carrier. The plates 10 and 16 are fixed relative to each other and form a revolvable housing forming one member of the clutch of which housing the support 22 is merely an extension, and this housing supports the bearings 27, 28. The shaft 29 extends through the housing and is supported in the bearings therein, the clutch disc 40 being located between the bearings as shown, and at least one (27) bearing being adjustable and engaging the disc 40 to move same along shaft 29 to adjust the friction as previously explained.

The advantages of this device will now be understood. Among the advantages are the following:

A continuously even pull will be maintained on the material being wound on the spool which is mounted on a shaft 47 and turns therewith. As the weight on the spool increases the friction pressure on the clutch automatically and substantially correspondingly increases to insure continued winding. The advantage of the present machine over applicant's prior Patent No. 1,705,899, issued March 19, 1929, is that in the present machine the friction all around the edge of the friction disc 40 is substantially uniform. As the weight on the shaft 47 increases, the left end of the shaft presses downwardly thereby pressing downwardly on the bushing 30. The tapered surface 31 of the bushing 30 presses downwardly against the inner tapered surface 28 of support 22 which is fixed. The bushing 30, therefore, is pressed to the left, pressing against washers 32 and 34 and thrust bearing 33. This pressure causes a pressure against collar 35 to the left. A pull is hence created on the shaft 29 to the left.

Since the left end of the shaft 29 has a tendency to tilt downwardly due to the weight of the reel, and since the shaft has a tendency to move to the left due to the cam action of bushing 30 within tapered opening 28, the right hand end of the shaft has a tendency to press upwardly and move to the left. Since the tapered hub 41 of the friction disc 40 slides on the shaft, an upward pressure at the right hand end of the shaft will cause the tapered hub 41 to press against the tapered surface 27 of the bushing 21, and pressure of the shaft 29 to the left will cause the collar 44 to press against the washers 43 and 42 and hence against the bushing 21 to the left, and the tapered surface of the hub 41 pressing against the tapered surface 27 of the bushing 21 causes the friction disc to move to the left and thereby pressing the peripheral edge of said friction disc evenly all around the surface 51 of clutch member 10.

Other advantages of this construction are as follows:

The thrust ball bearing 33 reduces friction and gives quicker pick up when the reel starts. Furthermore, the tapered bushing 30 floats free on the shaft 29 and provides two bearing surfaces, one at the tapered surfaces 30, 28 and one through the axial opening in said bushing 35.

It will be noted further that the outer housing 16 has a hub to journal the tapered bearing 21. Said tapered bearing turns within said clutch housing 16. The tapered bearing 21 may turn either with the clutch housing 16 or with the tapered hub 41 of the friction disc 40. The collars 35 and 44 merely hold the various parts on the shaft in assembled relation and keep end play of the parts to a minimum.

It will be noted that there is a clearance between the shaft 29 and the interior surface of the axial through opening of member 22.

What is claimed is:

1. In a device of the character described, a fixed sleeve support, a clutch member rotatable thereon, a shaft passing through said sleeve support, said sleeve support being formed at one end with a conical inner surface, a bushing slidable on the shaft and having an external conical surface contacting the internal conical surface of said sleeve support, a thrust bearing on the shaft, a collar on the shaft, said thrust bearing being interposed between said bushing and collar, means on the shaft and adjacent said collar to support a reel, a friction disc slidably mounted on the shaft and rotatable therewith, said clutch member and friction disc having contacting annular surfaces, said friction disc being formed with a hub provided with an external conical surface, a second collar on said shaft, and a bearing interposed between said hub and second collar, having an internal conical surface contacting the external conical surface of said hub.

2. In a device of the character described, a fixed sleeve support, a clutch member rotatable thereon, a shaft passing through said sleeve support, said sleeve support being formed at one end with a conical inner surface, a bushing slidable on the shaft and having an external conical surface contacting the internal conical surface of said sleeve support, a thrust bearing on the shaft, a collar on the shaft, said thrust bearing being interposed between said bushing and collar, means on the shaft and adjacent said collar to support a reel, a friction disc slidably mounted on the shaft and rotatable therewith, said clutch member and friction disc having contacting annular surfaces, said friction disc being formed with a hub provided with an external conical surface, a second collar on said shaft, and a bearing interposed between said hub and second collar, having an internal conical surface contacting the external conical surface of said hub, and a clutch housing member attached to said clutch member and being formed with an annular sleeve surrounding said bearing.

3. In a device of the character described, a fixed sleeve support, a clutch member rotatable thereon, a shaft passing through said sleeve support, said sleeve support being formed at one end with a conical inner surface, a bushing slidable on the shaft and having an external conical surface contacting the internal conical surface of said sleeve support, a thrust bearing on the shaft, a collar on the shaft, said thrust bearing being interposed between said bushing and collar, means on the shaft and adjacent said collar to support a reel, a friction disc slidably mounted on the shaft and rotatable therewith, said clutch member and friction disc having contacting annular surfaces, said friction disc being formed with a hub provided with an external conical surface, a second collar on said shaft, and a bearing interposed between said hub and second collar, having an internal conical surface contacting the external conical surface of said hub, a clutch housing member attached to said clutch member and being formed with an annular sleeve surrounding said bearing, and means attached to said clutch member and housing to receive a drive means for rotating said clutch member and housing member.

4. In a device for winding a reel, a fixed sleeve support formed with an axial through opening, a shaft extending through said opening, and beyond the opposite ends of said sleeve support, there being a clearance between said shaft and through opening, said sleeve support being formed with an inner conical surface at one end, a bushing on said shaft having an external conical surface contacting said inner conical surface, a collar on said shaft, said bushing being interposed between said support and said collar, means on said shaft and beyond said collar to support a reel to be wound, a clutch member rotatably mounted on said sleeve support and being formed with an annular clutch surface, a friction disc slidably mounted on said shaft, means to cause said friction disc to rotate with said shaft, said friction disc having an annular friction surface adapted to contact the friction surface on said clutch member, said friction disc having a hub formed with an external conical surface, a bearing surrounding said shaft and having an internal conical surface contacting the external conical surface of said hub, and means on said shaft to retain said bearing in contact with said hub.

5. In a device for winding a reel, a fixed sleeve support formed with an axial through opening, a shaft extending through said opening, and beyond the opposite ends of said sleeve support, there being a clearance between said shaft and through opening, said sleeve support being formed with an inner conical surface at one end, a bushing on said shaft having an external conical surface contacting said inner conical surface, a collar on said shaft, said bushing being interposed between said support and said collar, means on said shaft and beyond said collar to support a reel to be wound, a clutch member rotatably mounted on said sleeve support and being formed with an annular clutch surface, a friction disc slidably mounted on said shaft, means to cause said friction disc to rotate with said shaft, said friction disc having an annular friction surface adapted to contact the friction surface on said clutch member, said friction disc having a hub formed with an external conical surface, a bearing surrounding said shaft and having an internal conical surface contacting the external conical surface of said hub, and means on said shaft to retain said bearing in contact with said hub, and a thrust bearing interposed between said bushing and collar and surrounding said shaft.

6. In a device for winding a reel, a fixed sleeve support formed with an axial through opening, a shaft extending through said opening, and beyond the opposite ends of said sleeve support, there being a clearance between said shaft and through opening, said sleeve support being formed with an inner conical surface at one end, a bushing on said shaft having an external conical surface contacting said inner conical surface, a collar on said shaft, said bushing being interposed between said support and said collar, means on said shaft and beyond said collar to support a reel to be wound, a clutch member rotatably mounted on said sleeve support and being formed with an annular clutch surface, a friction disc slidably mounted on said shaft, means to cause said friction disc to rotate with said shaft, said friction disc having an annular friction surface adapted to contact the friction surface on said clutch member, said friction disc having a hub formed with an external conical surface, a bearing surrounding said shaft and having an internal conical surface contacting the external conical surface of said hub, and means on said shaft to retain said bearing in contact with said hub, a thrust bearing interposed between said bushing and collar and surrounding said shaft, a clutch housing member attached to said clutch member and said friction disc being interposed between said clutch member and said clutch housing member.

7. In a device for winding a reel, a fixed sleeve support formed with an axial through opening, a shaft extending through said opening, and beyond the opposite ends of said sleeve support, there being a clearance between said shaft and through opening, said sleeve support being formed with an inner conical surface at one end, a bushing on said shaft having an external conical surface contacting said inner conical surface, a collar on said shaft, said bushing being interposed between said support and said collar, means on said shaft and beyond said collar to support a reel to be wound, a clutch member rotatably mounted on said sleeve support and being formed with an annular clutch surface, a friction disc slidably mounted on said shaft, means to cause said friction disc to rotate with said shaft, said friction disc having an annular friction surface adapted to contact the friction surface on said clutch member, said friction disc having a hub formed with an external conical surface, a bearing surrounding said shaft and having an internal conical surface contacting the external conical surface of said hub, and means on said shaft to retain said bearing in contact with said hub, a thrust bearing interposed between said bushing and collar and surrounding said shaft, a clutch housing member attached to said clutch member and said friction disc being interposed between said clutch member and said clutch housing member, said clutch housing member being formed with an annular sleeve portion surrounding said bearing.

8. In a device for winding a reel, a fixed sleeve support formed with an axial through opening, a shaft extending through said opening, and beyond the opposite ends of said sleeve support, there being a clearance between said shaft and through opening, said sleeve support being formed with an inner conical surface at one end, a bushing on said shaft having an external conical surface contacting said inner conical surface, a collar on said shaft, said bushing being interposed between said support and said collar, means on said shaft and beyond said collar to support a reel to be wound, a clutch member rotatably mounted on said sleeve support and being formed with an annular clutch surface, a friction disc slidably mounted on said shaft, means to cause said friction disc to rotate with said shaft, said friction disc having an annular friction surface adapted to contact the friction surface on said clutch member, said friction disc having a hub formed with an external conical surface, a bearing surrounding said shaft and having an internal conical surface contacting the external conical surface of said hub, and means on said shaft to retain said bearing in contact with said hub, a thrust bearing interposed between said bushing and collar and surrounding said shaft, a clutch housing member attached to said clutch member and said friction disc being interposed between said clutch member and said clutch housing member, said clutch housing member being formed with an annular sleeve portion surrounding said bearing, said bearing being floatingly mounted on said shaft.

9. In a device for winding a reel, a fixed sleeve support formed with an axial through opening, a shaft extending through said opening and beyond the opposite ends of said sleeve support, there being a clearance between said shaft and through opening, said sleeve support being formed with an inner conical surface at one end, a bushing on said shaft having an external conical surface contacting said inner conical surface, a collar on said shaft, said bushing being interposed between said support and said collar, means on said shaft and beyond said collar to support a reel to be wound, a clutch member rotatably mounted on said sleeve support and being formed with an annular clutch surface, a friction disc slidably mounted on said shaft, means to cause said friction disc to rotate with said shaft, said friction disc having an annular friction surface adapted to contact the friction surface on said clutch member, said friction disc having a hub formed with an external conical surface, a bearing surrounding said shaft and having an internal conical surface contacting the external conical surface of said hub, and means on said shaft to retain said bearing in contact with said hub, a thrust bearing interposed between said bushing and collar and surrounding said shaft, a clutch housing member attached to said clutch member and said friction disc being interposed between said clutch member and said clutch housing member, said clutch housing member being formed with an annular sleeve portion surrounding said bearing, said bearing being floatingly mounted on said shaft, the means for retaining the bearing in contact with said hub comprising a nut on the shaft and washers interposed between said nut and said bearing.

10. In a device for winding a reel, a fixed sleeve support formed with an axial through opening, a shaft extending through said opening and beyond the opposite ends of said sleeve support, there being a clearance between said shaft and through opening, said sleeve support being formed with an inner conical surface at one end, a bushing on said shaft having an external conical surface contacting said inner conical surface, a collar on said shaft, said bushing being interposed between said support and said collar, means on said shaft and beyond said collar to support a reel to be wound, a clutch member rotatably mounted on said sleeve support and being formed with an annular clutch surface, a friction disc slidably mounted on said shaft, means to cause said friction disc to rotate with said shaft, said friction disc having an annular friction surface adapted to contact the friction surface on said clutch member, said friction disc having a hub formed with an external conical surface, a bearing surrounding said shaft and having an internal conical surface contacting the external conical surface of said hub, and means on said shaft to retain said bearing in contact with said hub, a thrust bearing interposed between said bushing and collar and surrounding said shaft, a clutch housing member attached to said clutch member and said friction disc being interposed between said clutch member and said clutch housing member, said clutch housing member being formed with an annular sleeve portion surrounding said bearing, said bearing being floatingly mounted on said shaft, the means for retaining the bearing in contact with said hub comprising a nut on the shaft and washers interposed between said nut and said bearing, and a ring attached to the clutch member and being provided with means to receive a drive belt.

11. In a device of the character described, a fixed sleeve support, a clutch member rotatable thereon, a shaft passing through said sleeve support, said sleeve support being formed at one end with a conical inner surface, a bushing slidable on the shaft and having an external conical surface contacting the internal conical surface of said sleeve support, a thrust bearing on the shaft, a collar on the shaft, said thrust bearing being interposed between said bushing and collar, a friction disc slidably mounted on the shaft and rotatable therewith, said clutch member and friction disc having contacting annular surfaces, said friction disc being formed with a hub provided with an external conical surface, a second collar on said shaft, and a bearing interposed between said hub and second collar, having an internal conical surface contacting the external conical surface of said hub.

JOSEPH CLAYTON.

REFERENCES CITED

The following references are of record in the file of this patent:

UNITED STATES PATENTS

| Number | Name | Date |
|---|---|---|
| 1,398,680 | Clayton | Nov. 29, 1921 |
| 1,512,446 | Barnes | Oct. 21, 1924 |
| 1,705,899 | Clayton | Mar. 19, 1929 |
| 1,904,411 | Clayton | Apr. 18, 1933 |
| 2,078,893 | Price | Apr. 27, 1937 |
| 2,246,191 | Schmitz | June 17, 1941 |